R. D. MARX.
CARROUSEL.
APPLICATION FILED NOV. 1, 1921.
1,437,534. Patented Dec. 5, 1922.
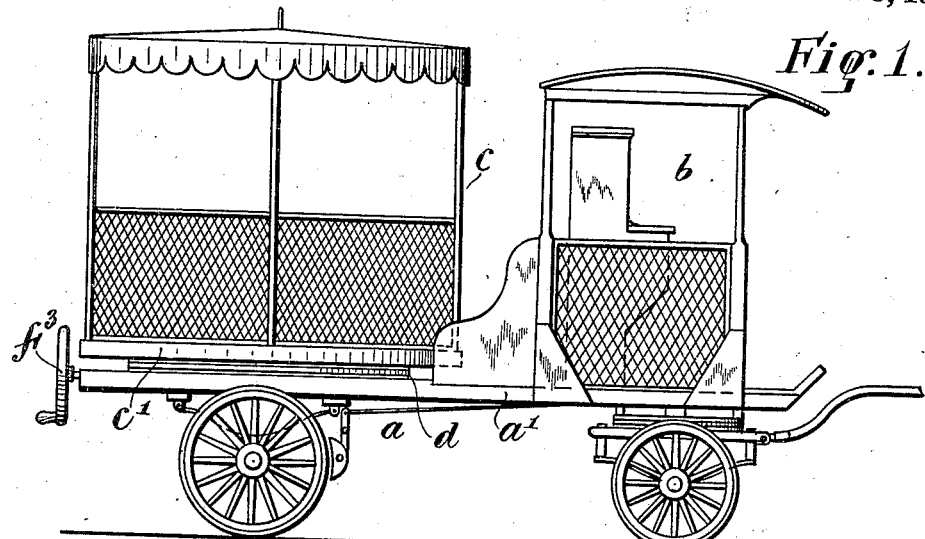
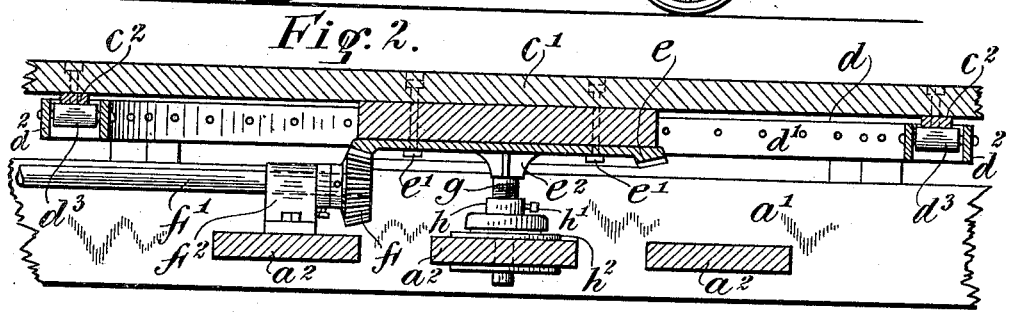
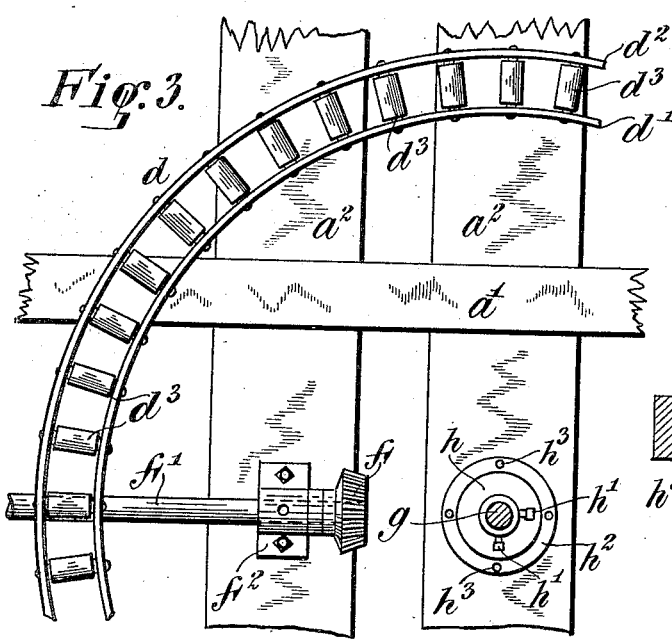
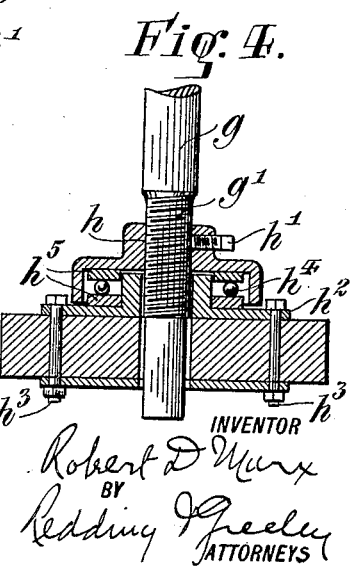
INVENTOR
Robert D. Marx
BY
Redding & Greeley
ATTORNEYS Patented Dec. 5, 1922.

1,437,534

UNITED STATES PATENT OFFICE.

ROBERT D. MARX, OF BROOKLYN, NEW YORK, ASSIGNOR TO GEORGE B. MARX, OF BROOKLYN, NEW YORK.

CARROUSEL.

Application filed November 1, 1921. Serial No. 511,975.

*To all whom it may concern:*

Be it known that I, ROBERT D. MARX, a citizen of the United States, residing in the borough of Brooklyn of the city of New York, in the State of New York, have invented certain new and useful Improvements in Carrousels, of which the following is a specification, reference being had to the accompanying drawing, forming a part hereof.

This invention has for its object to improve the means for supporting the turntables of carrousels or merry-go-rounds so as to assure safety and prevent tendency of the turntable to wabble even under varying loads and after continued use. The invention has been developed with particular reference to its application to easily portable carrousels, that is, carrousels which can be mounted for use on trucks and transported readily from place to place. The invention will be explained more fully hereinafter with reference to the accompanying drawing in which it is illustrated and in which—

Figure 1 is a view in side elevation of a carrousel mounted upon a truck.

Figure 2 is a detail view, in section and on a larger scale, showing a portion of the turntable and the supporting and operating means.

Figure 3 is a partial top view of the parts shown in Figure 2, with the turntable removed.

Figure 4 is a detail view in section of the central support.

In the embodiment of the invention illustrated in the drawing, a horse-drawn truck $a$ has a suitable cab $b$ at one end for the driver and for a piano and its performer and supports a turntable $c$ on which can be mounted such animal figures or carriages as are common to such means of amusement, the turntable being adapted to be rotated about its own vertical axis. As shown the longitudinal frame members $a'$ of the truck body and the cross members $a^2$ support the turntable $c$, the floor of which is indicated at $c'$. Upon the frame members $a'$ is mounted an annular roller bearing $d$, having two concentric rings $d'$ and $d^2$ between which are mounted rollers $d^3$. To the under side of the floor $c'$ of the turntable is secured an annular bearing plate $c^2$ which rests upon the annular roller bearing $d$ and carries the weight of the turntable and its load near the periphery of the turntable.

Also secured to the under side of the turntable and centrally is a beveled gear $e$ which is engaged by a driving pinion $f$ on a shaft $f'$, mounted in suitable bearings, one of which is shown at $f^2$, and provided, at the rear end of the truck, with a hand wheel or crank $f^3$ by means of which the desired movement of rotation can be imparted to the turntable. The gear $e$ can be secured to the floor of the turntable by any convenient means, as by bolts $e'$.

In the hub $e^2$ of the gear $e$ is secured a spindle $g$, which is threaded at its lower portion, as at $g'$, and receives adjustably thereon the threaded upper member $h$ of a thrust bearing, set screws $h'$ being provided to secure the bearing member $h$ in adjusted position. The thrust bearing includes a lower member $h^2$ which is secured by bolts $h^3$ to one of the cross frame members, and the usual bearing balls $h^4$ with the bearing rings or raceways $h^5$.

In the operation of such a carrousel as that illustrated, which is comparatively light, of small capacity, and operable by man power, it is found desirable, in order to secure ease of operation, to prevent wabbling or irregular motion of the turntable, and to assure safety, that the distribution of weight between the center and the periphery of the turntable be regulated. The ordinary king-pin furnishes simply a center of rotation and prevents lateral displacement of the turntable, while the weight is supported wholly at or near the periphery. This has proved unsatisfactory. By the present invention, however, the spindle $g$, which passes down through an opening in the cross frame member, not only serves the purpose of an ordinary king-pin, to prevent lateral displacement, but by the provision of the adjustable thrust bearing, affords means whereby the spindle can carry a portion of the weight of the turntable and its load, with the desirable results above mentioned.

I claim as my invention:

1. In a carrousel, the combination of a turntable, a supporting frame, an annular bearing interposed between the frame and the turntable, a central spindle secured to the turntable and engaged with the frame to prevent lateral displacement of the turntable, and a thrust bearing interposed between the spindle and the frame to support the load at the center of the turntable, one member of the thrust bearing being adjustable vertically.

2. In a carrousel, the combination of a turntable, a supporting frame, an annular bearing interposed between the frame and the turntable, a central spindle secured to the turntable and engaged with the frame to prevent lateral displacement of the turntable, and a thrust bearing interposed between the spindle and the frame to support the load at the center of the turntable, the spindle being threaded and receiving adjustably the upper member of the thrust bearing.

This specification signed this 28 day of October, A. D. 1921.

ROBERT D. MARX.